Patented July 2, 1946

2,403,185

UNITED STATES PATENT OFFICE 2,403,185

PREPARATION OF SULPHONIC COMPOUNDS

Norman E. Lemmon, Hammond, Ind., and David W. Bransky and Eugene E. Langan, Chicago, Ill., assignors to Standard Oil Company, Chicago, Ill., a corporation of Indiana No Drawing. Application December 30, 1943, Serial No. 516,312

9 Claims. (Cl. 260—504)

The present invention relates to improvements in the preparation of sulphonic compounds and more particularly to the preparation of preferentially oil-soluble petroleum sulphonic compounds having reduced inorganic salt content.

Preferentially oil-soluble sulphonic compounds; namely, sulphonic acids and sulphonates are obtained by the sulphuric acid treatment of hydrocarbon oils, particularly the viscous petroleum oils. In the sulphuric acid treatment of viscous petroleum oils, such as lubricating oils, insulating oils, pale oils, turbine oils, technical white oils, mineral medicinal white oils and the like, the oils are conventionally treated successively with a number of portions of concentrated or fuming sulphuric acid or with $SO_3$. For example, the oil may be treated with portions or "dumps" of 0.5 pound of fuming sulphuric acid per gallon of oil until the required total quantity of acid has been used, usually from about 3 pounds to about 8 pounds of acid per gallon of oil. After each acid dump the acid sludge produced is permitted to settle and withdrawn before the subsequent portion of acid is added to the oil.

A variety of sulphur-containing compounds are formed by the chemical reactions which result by the action of the sulphuric acid or $SO_3$ upon the hydrocarbon oil. Among the compounds formed are sulphonic acids, inorganic esters of sulphuric acid, partial esters of sulphuric acid, etc. Most of these compounds are relatively insoluble in the oil under treating conditions and separate from the oil, together with a large portion of the unreacted acid, in the sludge which is withdrawn. Two types of sulphonic acids are formed. Some of the sulphonic acids are preferentially oil-soluble and because of their characteristic reddish mahogany color are commonly referred to in the petroleum art as mahogany acids. Other sulphonic acids are preferentially water-soluble and are largely segregated in the acid sludge layer. These water-soluble sulphonic acids have a characteristic green color and are popularly referred to as green acids.

Conventionally the acid-treated oil containing oil-soluble sulphonic acids, some $SO_2$, unreacted sulphuric acid, and preferentially water-soluble sulphonic acids, is treated with an alkali, such as caustic soda, caustic potash, ammonia and the like, to neutralize the acidity and to form preferentially oil-soluble sulphonates or the so-called oil-soluble mahogany soaps. The oil-soluble mahogany soaps are then extracted from the oil by means of a suitable solvent such as an alcohol. The neutralization of the acid-treated oil containing some unreacted sulphuric acid and green sulphonic acids results in the formation of inorganic salts, such as inorganic sulphates, and some green acid soap, which are extracted with and are occluded in the desired mahogany soap. The presence of these inorganic salts which are principally sodium sulphate greatly lowers the efficiency and the value of the mahogany soaps as emulsifying agents and their use for various other purposes. Heretofore attempts have been made to desalt the crude mahogany soap but this is difficult to do and even after desalting, the mahogany soap frequently contains from 2 to 4% inorganic salts. The methods heretofore employed in attempts to remove inorganic salts from mahogany soaps usually involved extraction with various types of solvents, strong alcoholic solutions being most commonly employed.

An object of this invention is to provide a method of preparing oil-soluble mahogany sulphonates free of substantial amounts of inorganic salts.

Another object of the invention is to provide a method of preparing oil-soluble mahogany sulphonates having a low inorganic salt content.

Still another object of the invention is to provide a method of preparing oil-soluble sulphonic acids substantially free of sulphuric acid, $SO_2$ and water-soluble green sulphonic acids.

Another object of the invention is to provide a method of preparing preferentially oil-soluble petroleum sulphonates free of substantial amounts of inorganic salts.

A further object of the invention is to provide a method of purifying preferentially oil-soluble petroleum sulphonic acids and/or sulphonates.

It has been discovered that the foregoing objects can be attained by the selective removal from acid-treated oils, before neutralization, of the free sulphuric acid and $SO_2$ present in such oils after treatment with sulphuric acid. Since the objectionable inorganic salts in preferentially oil-soluble petroleum sulphonic acids and/or sulphonates are formed by reaction between the free sulphuric acid and $SO_2$ and the neutralizing agent, for example sodium hydroxide, the removal of the former from the acid-treated oil eliminates the formation of the inorganic salts, such as, for example, sodium sulphate.

While other means can be employed to selectively remove sulphuric acid and other inorganic salt-forming constituents from sour oils, it is preferred to contact the sour oils with a small amount, for example from about 0.5 to about 10% and preferably from about 1% to about 5%, of a solid sorbent material such as a solid adsorbent or absorbent material or a combination thereof. Various adsorbent materials may be used for the purposes of the present invention, such as, for example, the adsorbent clays, such as Attapulgus clay, Floridin, Filter-Cel, fuller's earth, bentonite, magnesite, bauxite, acid-treated clays, and other decolorizing clays. The solid adsorbent material may be from about a 16/30 mesh to about a 20/90 mesh, but preferably about a 100/200 mesh. Materials of smaller particle size can also be used, for example a 200 mesh material. Examples of suitable absorbents are diatomaceous earth materials known as "Celite," "Filter-Cel" and the like, and cellulose materials such as, for example, paper pulp.

The desired small amount of sorbent material is thoroughly contacted with the acid treated oil at temperatures within the range of from about room temperature (of about 80° F.) to about 300 or 350° F. and preferably from about 100° F. to about 250° F. for a period of time within the range of from about 5 minutes to about 90 minutes and preferably from about 10 minutes to about 30 minutes. After thoroughly agitating with an inert gas and contacting the acid-treated oil with the sorbent material, the latter is removed by any suitable means, such as by filtration or more preferably by filter pressing. The acid-treated oil after treatment with the sorbent material is substantially free of all sulphuric acid and $SO_2$ as well as objectionable water-soluble green sulphonic acids. The acid-treated oil freed of these undesirable impurities can then be neutralized with the desired neutralizing agent, such as sodium hydroxide, potassium, hydroxide, ammonia and the like, to form the corresponding oil-soluble mahogany sulphonates or soaps which can then be extracted from the oil with alcohol or other suitable solvents. The oil-soluble mahogany soap recovered after removal of the solvent, such as by distillation, is substantially free of inorganic salts and other impurities and requires no further purification. If desired the oil-soluble mahogany soap formed during the neutralization of the acid-treated oil may be left in the neutralized oil and the mixture of mahogany soap and oil used for any desired purpose, such as, for example, in preparing so-called soluble oils.

When acid-treated oils are treated with small amounts of adsorbent materials in the manner herein described substantially all of the free sulphuric acid and $SO_2$ is removed without removing substantially any of the desired oil-soluble mahogany acids. This is demonstrated by the following data obtained by treating a petroleum oil having a Saybolt Universal viscosity at 100° F. of about 125 seconds with 3 pounds of fuming sulphuric acid per gallon of oil, the acid being added in dumps of ½ pound per gallon of oil with removal of the sludge before each subsequent addition of acid. Portions of this acid treated oil were then contacted with 1% and with 3% Attapulgus clay at a temperature of 100° F. for about 30 minutes. The effective removal of sulphuric acid from the acid treated oil is illustrated by the following data:

Table I

| Treatment of acid-treated oil | Composition of acid-treated oil | | |
|---|---|---|---|
| | Percent [1] oil | Percent [1] mahogany acid | Percent [1] $H_2SO_4$ |
| Before contacting with clay | 92.4 | 7.7 | 0.39 |
| After contacting with 1% clay | 92.4 | 7.6 | 0.12 |
| After contacting with 3% clay | 92.4 | 7.6 | 0.08 |

[1] Weight percent.

The above data demonstrate the substantially complete removal of sulphuric acid from acid-treated oils when contacted with small amounts of an adsorbent material. The data also demonstrate that substantially no mahogany acids are removed from the acid-treated oil by the treatment of sour oil with small amounts of adsorbent material under the stated conditions.

In another example a high viscosity coastal oil having a Saybolt Universal viscosity at 100° F. of about 600 seconds was treated with 3 pounds of fuming sulphuric acid and after removal of the acid sludge was blown free of $SO_2$. The acid-treated oil was then contacted with 1% of Filter-Cel at 150° F. for ½ hour. The composition of the acid-treated oil before and after contacting with the Filter-Cel is given in the following table:

Table II

| Treatment of acid-treated oil | Composition of acid-treated oil | | | |
|---|---|---|---|---|
| | Percent [1] oil | Percent [1] mahogany acid | Percent [1] $H_2SO_4$ | Percent [1] green acids |
| Before contacting with Filter-Cel | 92.4 | 7.7 | 0.32 | 0.03 |
| After contacting with 1% Filter-Cel | 92.4 | 7.6 | 0.04 | 0.00 |

[1] Weight percent.

The above data show the substantially complete removal of sulphuric acid and green acid from acid-treated oils by contacting with small amounts of an absorbent material under the treating conditions without the removal of oil and mahogany acids.

In another example a distillate oil having a Saybolt Universal viscosity at 100° F. of about 125 seconds was treated with 3 pounds of fuming sulphuric acid in dumps of ½ pound of acid per gallon of oil. After removal of the acid sludge, the acid-treated oil was contacted with 1% Attapulgus clay at room temperature and filtered. The filtered oil was then neutralized with sodium hydroxide and the mahogany soaps resulting from the neutralization extracted with alcohol. After removal of the alcohol the recovered mahogany soap showed on analysis 27.4% oil, 68.4% mahogany soap, 0.64% inorganic salt and the rest water. Under conventional methods of treatment the recovered mahogany soap would normally show a salt content of about 7%.

In another example an M. C. distillate oil having a Saybolt viscosity at 100° F. of 172 seconds was acid-treated at 180° F. with 4 lbs. of fuming acid in 0.5 lb. dumps, and contacted with 0.5% Attapulgus clay plus 0.5% of Filter-Cel at 150° F. with air agitation to remove the $SO_2$, and filtered. The filtered oil was neutralized with caustic solution, giving a product which contained 89% oil, 9.6% soap and 0.2% salts. This product gave a good emulsion test for soluble oil production and was resistant to the conventional rusting tests.

The effectiveness of an absorbent, such as paper pulp in reducing the salt content of oil-soluble sulphonates is illustrated by the following experiment: A sulphuric acid sludge obtained by treating a viscous mineral oil with about three pounds of fuming sulphuric acid was extracted with a finished white mineral oil at room temperature. Three extractions were made and the extracts combined and settled, and portions of the settled oil used in the following tests:

(A) Without a preliminary treatment the oil was extracted with 60% alcohol and the alcohol extract neutralized and dried.

(B) The oil was contacted with 1% (by weight) clay fines at 150° F. for one hour, filtered and the filtrate extracted with 60% alcohol.

The alcohol extract was then neutralized and dried.

(C) The oil was contacted with 0.5% (by weight) absorbent paper pulp at 150° F. for one hour, filtered and the filtrate extracted with 60% alcohol. The alcohol extract was then neutralized and dried.

The oil-soluble sulphonates obtained in the three tests analyzed as follows:

| Oil sample | Percent oil-soluble soap | Percent oil | Percent salt |
|---|---|---|---|
| A | 72.5 | 16.8 | 2.8 |
| B | 64.5 | 17.7 | 1.8 |
| C | 74.5 | 18.5 | 0.8 |

The above data demonstrate that by treating acid-treated oils in accordance with the present invention, removal of salt-forming materials from the acid-treated oil is effectively accomplished by the present invention.

We are aware that acid-treated oils have heretofore been treated with adsorbent materials such as clay. However, in the prior practice the acid-treated oil has been so treated with clay as to remove substantially all acidic materials including free sulphuric acid, water-soluble sulphonic acids as well as the oil-soluble sulphonic acids. It was the object in the prior processes of treating acid-treated oils with adsorbent materials to remove as completely as possible the acidic materials in the acid-treated oil in order to eliminate the necessity of neutralizing with an alkali and thereby avoid the formation of soaps and/or salts. In contrast to the prior methods the present invention provides a method of treating acid-treated oils with a sorbent material whereby only the inorganic salt-forming materials and the undesirable water-soluble sulphonic acids are removed, leaving in the acid-treated oil the desired preferentially oil-soluble sulphonic acids.

The term "sour oil" as used in the appended claims means an acid-treated unneutralized oil. The term "acid-treated oil" as used herein and in the appended claims means an oil treated with sulphuric acid or with $SO_3$.

The term "sorbent" as used herein and in the appended claims refers generically to adsorbing and adsorbing solids.

Although the present invention has been illustrated by certain specific embodiments thereof, it is not intended that the invention should be limited thereto except in so far as the same is defined by the following claims.

We claim:

1. In the preparation of preferentially oil-soluble sulphonic acid soaps in which a hydrocarbon oil is treated with fuming sulphuric acid, the acid sludge separated and the sour oil neutralized to form preferentially oil-soluble sulphonates, the improvement comprising contacting the sour oil with from 1% to about 5% of a solid sorbent material whereby substantially all of the unreacted sulphuric acid is removed from the sour oil, removing the sorbent material and neutralizing the filtrate whereby preferentially oil-soluble sulphonic acid soaps substantially free of inorganic salts are obtained.

2. The method of claim 1 in which the sorbent material is a solid adsorbent material.

3. The method of claim 1 in which the sorbent material is a clay.

4. The method of claim 1 in which the sorbent material is a solid absorbent material.

5. The method of claim 1 in which the sorbent material is paper pulp.

6. The method of claim 1 in which the sorbent material is a mixture of a solid adsorbent and a solid absorbent material.

7. The method of claim 1 in which the sorbent material is a mixture of clay and Filter-Cel.

8. In the preparation of preferentially oil-soluble sulphonic acid soaps in which a hydrocarbon oil is treated with fuming sulphuric acid, the sludge formed removed from the acid-treated oil and the sludge-free sour oil then neutralized, the improvement comprising contacting the sour oil containing oil-soluble sulphonic acids and unreacted sulphuric acid with from 1% to about 5% of a sorbent material at a temperature within the range of from about 80° F. to about 350° F. whereby substantially all of the unreacted sulphuric acid is removed from the sour oil, removing the solid sorbent material from the sour oil, neutralizing the sour oil to convert the preferentially oil-soluble sulphonic acids to the corresponding sulphonates substantially free of inorganic salts, and extracting the resultant preferentially oil-soluble sulphonates from the neutralized oil.

9. In the preparation of preferentially oil-soluble sulphonic acid soaps in which a hydrocarbon oil is treated with fuming sulphuric acid, the sludge formed removed from the acid-treated oil and the sludge-free sour oil then neutralized, the improvement comprising contacting the sour oil containing oil-soluble sulphonic acids and unreacted sulphuric acid with from 1% to about 5% of a sorbent material at a temperature within the range of from about 80° F. to about 350° F. whereby substantially all of the unreacted sulphuric acid is removed from the sour oil, removing the solid sorbent material from the sour oil, extracting the preferentially oil-soluble sulphonic acids from the sour oil and neutralizing the same to obtain preferentially oil-soluble sulphonates substantially free of inorganic salts.

NORMAN E. LEMMON.
DAVID W. BRANSKY.
EUGENE E. LANGAN.